United States Patent
Bethke et al.

(10) Patent No.: US 9,538,777 B2
(45) Date of Patent: Jan. 10, 2017

(54) METHOD AND APPARATUS FOR REDUCING AFLATOXIN-CONTAMINATED CORN

(71) Applicant: CARGILL, INCORPORATED, Wayzata, MN (US)

(72) Inventors: Nicholas Wayne Bethke, University Park, IA (US); Chad Allen Conard, Delano, MN (US); Marie Khagik Costanian, Kettering, OH (US); Lawrence E. Fosdick, Troy, OH (US); Eugene Joseph Fox, Dayton, OH (US); Donald Grunig, Oskaloosa, IA (US); Steven W. Kirkvold, Omaha, NE (US); Abhay R. Ladhe, Eden Prairie, MN (US); Jacob A. Leland, Mitchell, SD (US); Joseph Michael Lewis, Arlington, NE (US); Eugene Max Peters, Kettering, OH (US); Anthony John Schanilec, Otley, IA (US); Riley Neil Smith, Omaha, NE (US); Eric Sumner, Minneapolis, MN (US); Ping Yang, Dayton, OH (US); Hadi Nayef Yehia, Beavercreek, OH (US); Jill Louise Zullo, Excelsior, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 14/567,251

(22) Filed: Dec. 11, 2014

(65) Prior Publication Data
US 2015/0090642 A1 Apr. 2, 2015

Related U.S. Application Data

(63) Continuation of application No. 13/833,142, filed on Mar. 15, 2013, now Pat. No. 8,919,569.

(Continued)

(51) Int. Cl.
*B03D 1/00* (2006.01)
*A23L 1/015* (2006.01)
(Continued)

(52) U.S. Cl.
CPC .............. *A23L 1/015* (2013.01); *A23B 9/00* (2013.01); *A23L 1/1025* (2013.01); *B03B 5/28* (2013.01);
(Continued)

(58) Field of Classification Search
CPC .............. B03B 5/28; B03B 5/30; A23L 1/015
(Continued)

(56) References Cited

U.S. PATENT DOCUMENTS 2,517,117 A * 8/1950 Komline ................ B01D 21/12
210/524
3,822,015 A * 7/1974 Hsieh ........................ B03B 5/28
209/10

(Continued)

FOREIGN PATENT DOCUMENTS

WO 93/20916 A1 10/1993

OTHER PUBLICATIONS

Brekke, O., et al., "Cleaning Trials for Corn Containing Aflatoxin", American Assoc. of Cereal Chemists, Vo. 52 (1975), pp. 198-204.
(Continued)

*Primary Examiner* — Terrell Matthews

(57) ABSTRACT

Methods and apparatus for separating and removing aflatoxin-contaminated corn from batches of corn by a floating process, thus producing a distinguishable floating mat of contaminated corn and a separate submerged bed of uncontaminated and less contaminated corn. The methods of this disclosure include removing the floating contaminated corn mat by a vacuum mechanism or by liquid flow. The methods reduce the aflatoxin level in the submerged corn bed as much (Continued)

as 80% from the initial aflatoxin level, while removing no more than 15% from the batch of corn.

13 Claims, 10 Drawing Sheets

Related U.S. Application Data

(60) Provisional application No. 61/713,149, filed on Oct. 12, 2012.

(51) Int. Cl.
    *B03B 5/28*     (2006.01)
    *A23L 1/10*     (2006.01)
    *A23B 9/00*     (2006.01)
    *B03B 5/30*     (2006.01)

(52) U.S. Cl.
    CPC . *B03B 5/30* (2013.01); *B03D 1/00* (2013.01); *A23V 2002/00* (2013.01)

(58) Field of Classification Search
    USPC .... 209/173, 466; 426/92, 93, 231, 430, 456; 435/68.1, 161
    See application file for complete search history.

(56) References Cited

U.S. PATENT DOCUMENTS

| | | | |
|---|---|---|---|
| 4,035,518 A | | 7/1977 | Carmona et al. |
| 4,055,674 A | | 10/1977 | Yano et al. |
| 4,361,651 A | * | 11/1982 | Keim .................. 435/161 |
| 4,591,431 A | * | 5/1986 | Sinha .................. B03B 1/00 209/164 |
| 4,795,651 A | * | 1/1989 | Henderson ............. B03B 5/28 426/456 |
| 4,946,584 A | | 8/1990 | Olney |
| 5,128,068 A | * | 7/1992 | Lahoda .................. G21F 9/04 209/18 |
| 5,230,160 A | | 7/1993 | Gross et al. |
| 5,244,099 A | * | 9/1993 | Zaltzman ............... A01D 33/04 209/466 |
| 5,487,998 A | * | 1/1996 | Umrigar et al. ................. 436/93 |
| 8,124,565 B2 | * | 2/2012 | Zeun et al. .................... 504/100 |
| 8,563,934 B2 | * | 10/2013 | Yao ..................... G01N 21/6456 250/338.1 |
| 8,919,569 B2 | * | 12/2014 | Bethke .................... B03D 1/00 209/173 |
| 2007/0142678 A1 | | 6/2007 | Losso et al. |
| 2007/0172914 A1 | | 7/2007 | Slabbekoorn et al. |
| 2009/0053368 A1 | | 2/2009 | Fox et al. |

OTHER PUBLICATIONS

Huff, William, et al., "Density Segregation of Corn and Wheat Naturally Contaminated with Aflatoxin, Deoxynivalenol and Zearalenone", Journal of Food Protection, vol. 48 (May 1985) pp. 416-420.

Piedade, Fabiana, et al., "Distribution of Aflatoxins in Corn Fractions Visually Segregated for Defects", Brazilian Journal of Microbiology vol. 33 (2002), pp. 250-254.

Anderson, "Detoxification of Aflatoxin-Contaminated Corn," Southern cooperative series bulletin, 279, Feb. 1983, pp. 87-90.

High School Physics Lab, Archimedes' Principle Explained, Apr. 30, 2007, http://hsphysicslab.blogspot.com/2007/04/archimedes-principle-explained.html, 81 pgs.

de Mello, "Development of Physcal and Optical Methods for in-shelf Brazil Nuts Sorting and Aflatoxin Reduction," J Agric Sci, vol. 1, No. 2, Dec. 2009, pp. 3-14.

Rotter et al., "Effectiveness of density segregation and sodium carbonate treatment on the detoxification of Fusarium-contaminated corn fed to growing pigs," J Sci Food Agric, Jul. 1995, vol. 68, Issue 3, first published online Sep. 19, 2006, available at http://onlinelibrary.wiley.com/doi/10.1002/jsfa.2740680312/abstract;jsessionid=CE0555ECBE6F388D9CA681D286A14E09.F01t02?deniedAccessCustomisedMessage=&userIsAuthenticated=false, abstract.

* cited by examiner

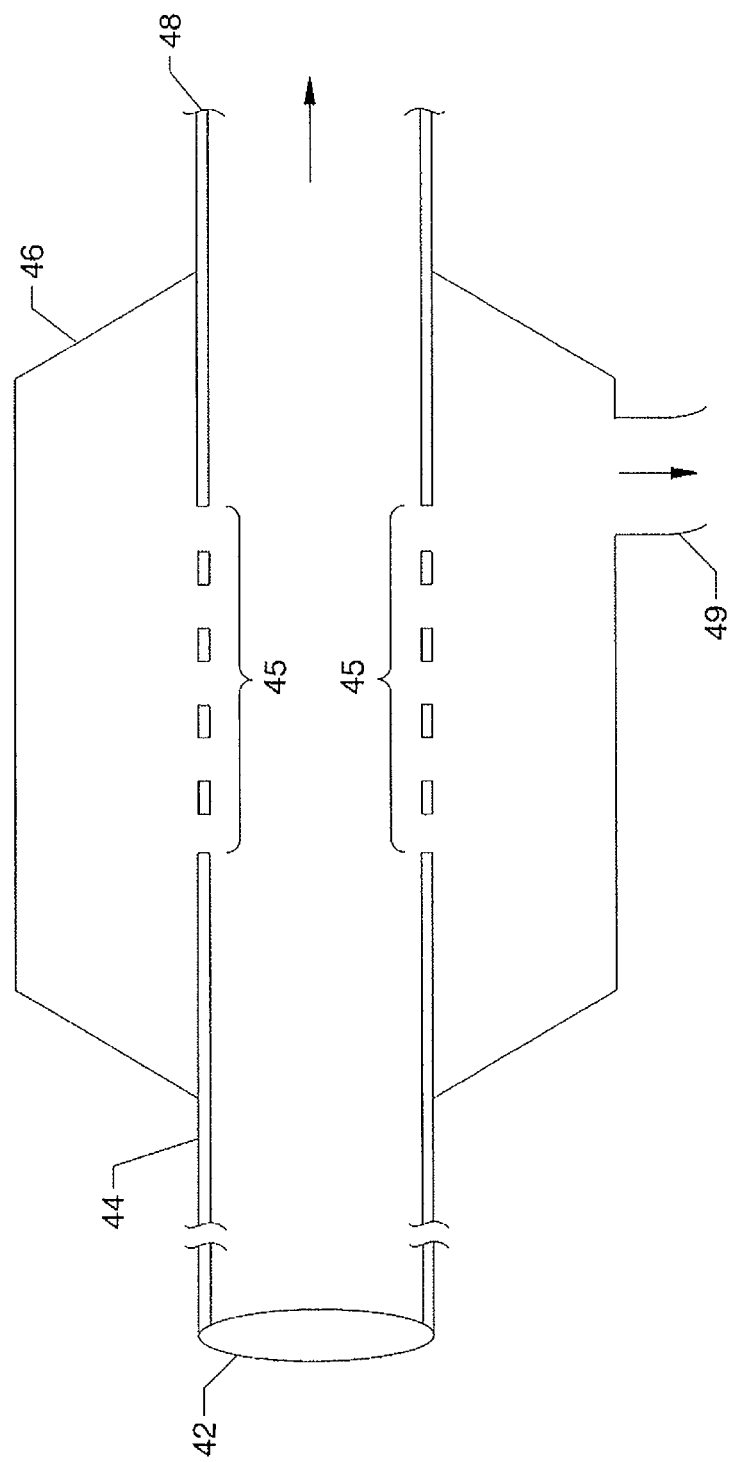

METHOD AND APPARATUS FOR REDUCING AFLATOXIN-CONTAMINATED CORN

CROSS-REFERENCE TO RELATED APPLICATION

This application is a continuation of U.S. application Ser. No. 13/833,142 filed Mar. 15, 2013, which claims the benefit of U.S. Provisional Application No. 61/713,149 filed Oct. 12, 2012, the entire contents of which are incorporated herein by reference for all purposes.

BACKGROUND

This disclosure relates to a method for separating mycotoxin-contaminated corn kernels from uncontaminated corn kernels. More particularly, the disclosure relates to separating aflatoxin-contaminated corn kernels from uncontaminated corn kernels.

Mycotoxins are a broad range of toxic materials produced by the growth of fungi on foods. Aflatoxin is a class of mycotoxins produced by the action of fungi, most commonly produced by members of *Aspergillus* section Flavi, on grain, seeds, kernels or nuts. Aflatoxin can affect grains such as corn and hops, oilseeds, such as cottonseed, soybean, almonds, Brazil nuts, pecans, pistachios, etc.

There are required limits on the amount of aflatoxin and other mycotoxins in products, particularly products which could be used as food or feed. There have been attempts to detoxify aflatoxin-contaminated food or feed sources such as corn, but in general these have had very limited success, often with undesirable side effects, either flavor degradation or destruction of the product itself. Therefore, the general treatment of aflatoxin-contaminated material is to attempt to separate the aflatoxin-contaminated material from the uncontaminated material. Various methods for sorting and removing contaminated corn are known, for example, optical detection (e.g., by color of the corn, or by overall damage to the corn).

Generally, the amount of contamination of a corn, grain, seed or nut product is measured by the parts per billion (ppb) or parts per million (ppm) aflatoxin in a sample of the product. If the parts per billion is below the acceptable limit for the end use, the sample or lot of material will be processed. However, if sampling misses several highly contaminated materials, some of the final product could be very high in aflatoxin even though the lot sampled at low aflatoxin level. Also, sampling variations can cause basically good lots of product to test high and be declared unusable. Therefore, a process which would separate contaminated product, particularly that which appears to be uncontaminated, is highly valuable. This process would allow the separation of contaminated products from other uncontaminated whole products, thus lowering the mycotoxin or aflatoxin level in the entire batch.

SUMMARY

The present disclosure provides methods and apparatus for separating and removing aflatoxin-contaminated corn from batches of corn by a floating process, thus producing a distinguishable floating mat of contaminated corn and a separate submerged bed of less contaminated corn. The methods of this disclosure include removing the floating contaminated corn mat by a vacuum mechanism or by liquid flow.

This disclosure provides, in one embodiment, a method for reducing aflatoxin levels in corn, the method comprising: providing a batch of corn comprising aflatoxin-contaminated corn and uncontaminated corn, the batch of corn having an initial aflatoxin level; combining the batch of corn with a liquid (e.g., having a density of 0.99-1.2, e.g., light steep water, heavy steep water, mill water, etc. and mixtures thereof) in a tank, the liquid having a volume sufficient to cover the batch of corn; allowing the aflatoxin-contaminated corn to float on the liquid and the uncontaminated corn to sink in the liquid forming a corn bed; and removing the floating aflatoxin-contaminated corn from the tank. The resulting corn bed has an aflatoxin level as much as 80% less or as much as 90% less than the initial aflatoxin level, and the removed aflatoxin-contaminated corn is no more than 15% of the batch of corn. In some embodiments, the removed aflatoxin-contaminated corn is no more than 10% of the batch of corn, in some embodiments no more than 5%, or in some embodiments 1-3%. In some embodiments, the resulting corn bed has an aflatoxin level of no more than 10 ppb, no more than 6 ppb, no more than 5 ppb, no more than 3 ppb, no more than 2 ppb, or even no more than 1 ppb.

The step of combining the batch of corn with a liquid in a tank may be done by adding initial liquid to the tank; and concurrently adding additional liquid and the batch of corn to the tank. This step of concurrently adding additional liquid and the batch of corn to the tank may be done subsequent to the step of adding initial liquid to the tank. Additionally, in some embodiments, the step of adding initial liquid to the tank comprises adding sufficient liquid to fill 20-85% of the volume of the tank, optionally about 30-55% of the volume of the tank, prior to adding the corn to the tank.

The floating aflatoxin-contaminated corn may be removed from the tank by vacuuming the floating aflatoxin-contaminated corn from the tank. Alternately, floating aflatoxin-contaminated corn may be removed from the tank by adding sufficient liquid to the tank to overflow or overspill the floating contaminated corn out from the tank.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which:

FIG. 3 is a schematic cross-sectional side view of an embodiment of a floating mat removal tool according to this disclosure.

DETAILED DISCUSSION OF THE INVENTION

Figure 1:
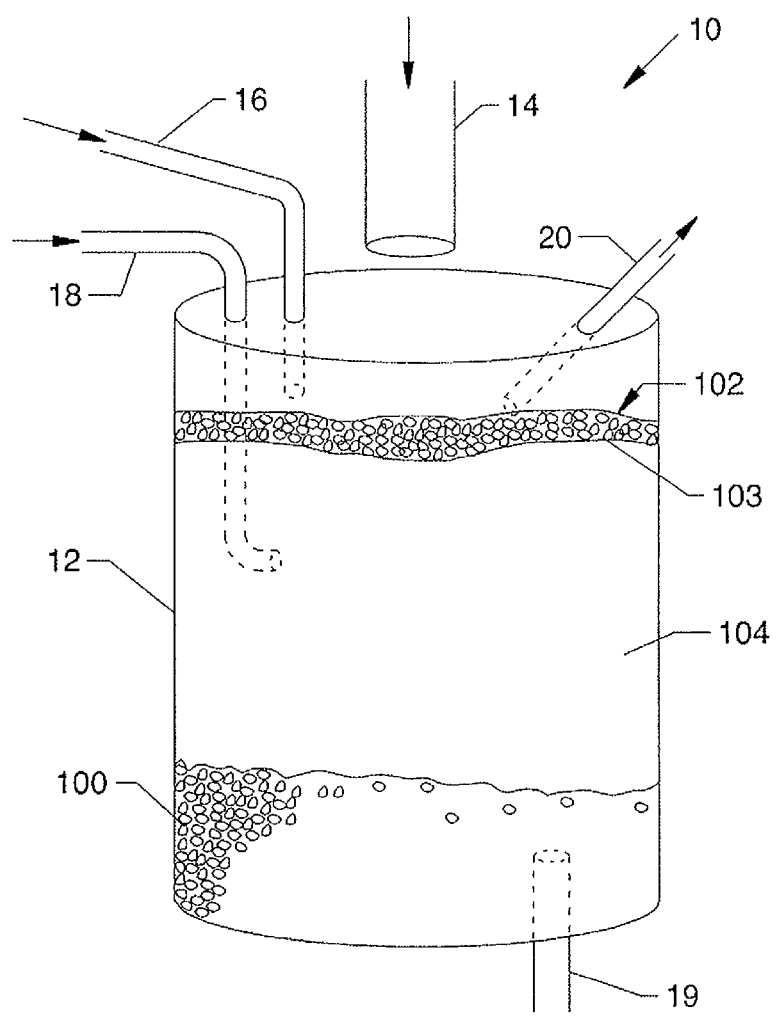
FIG. 1 is a schematic side view of a first embodiment of equipment for a process according to this disclosure.

The present disclosure provides various methods for identifying, separating and removing aflatoxin-contaminated grain in a batch from less contaminated grain. Although the methods of this disclosure are particularly adapted for identifying, separating and removing aflatoxin-contaminated corn kernels in a batch of corn from less contaminated kernels, the method(s) may be applicable to identifying, separating and removing other aflatoxin-contaminated grains such as hops, oilseeds, cottonseed, soybean, almonds, Brazil nuts, pecans, pistachios, etc.

Aflatoxin-contaminated corn kernels have a lower specific gravity then uncontaminated kernels. Thus, batches of corn may undergo a liquid floatation process to separate (floating) aflatoxin-containing kernels from (submerged) less contaminated and uncontaminated kernels. Subsequent removal of the aflatoxin-contaminated corn kernels results in a reduction of as much as 80% or more of the aflatoxin level in the remaining corn, for example, from 20 ppb to less than 4 ppb, or for example, from 5 ppb to less than 1 ppb, in the batch of corn. In some embodiments, the processes of this disclosure result in a reduction of as much as 90% or more of the aflatoxin level, while removing no more than about 5% of the corn, in some embodiments only 1-3% of the corn. In some embodiments, the processes of this disclosure result in a corn product that has an aflatoxin level of no more than 10 ppb, for example, no more than 6 ppb, no more than 5 ppb, no more than 3 ppb, no more than 2 ppb, or even no more than 1 ppb. The corn product obtained from these processes can be used in a variety of food or feed applications, including those disclosed in "Corn Wet Milted Feed Products", which is available at www.corn.org/wp-content/uploads/2009/12/Feed2006.pdf, the entire disclosure of which is incorporated herein by reference.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The process for separating and removing the contaminated-corn kernels from uncontaminated and less contaminated kernels of the present disclosure is particularly suited for implementation in a conventional corn processing process that includes a steep tank or a steeping step. The separation processes of this disclosure can be accomplished in a conventional steep tank, having modifications made to the existing equipment. In the steeping process, a tank (e.g., a stainless steel tank) is filled with corn kernels and steep water. During steeping, the corn kernels absorb water, increasing their moisture levels (e.g., from 15 percent to 45 percent) and more than doubling in size. As the corn swells and softens, the steep water begins to loosen the gluten bonds within the corn and release the starch. The removal processes of this disclosure can be broadly described as either a vacuum or suction process (shown in FIGS. 1, 2A, 2B) or an overflow or spillover process (shown in FIGS. 4A, 4B, 5A, 5B). After removal of the aflatoxin-contaminated corn kernels, the less contaminated and uncontaminated corn is coarsely ground to break the germ loose from other components. The ground corn, in a water slurry, flows to the germ separators. The corn is processed to provide numerous products, such as those disclosed in "Corn Wet Milled Feed Products".

Referring to FIG. 1, a steeping apparatus 10, which is part of a suction process according to this disclosure, is illustrated. Steeping apparatus 10 includes a steep tank 12, which can be a conventional steep tank for corn, often having a volume of about 30,000 to 300,000 gallons, although larger or smaller steep tanks could be used.

In this embodiment, steeping apparatus 10 includes a corn input feeder 14 that provides corn kernels to steep tank 12. In the illustrated embodiment, corn input feeder 14 is a pipe, for example, connected to a hopper, centered over tank 12. It should be understood that other mechanisms such as a conveyor belt could be used for corn input feeder 14, and that corn input feeder 14 may be positioned in an alternate location, such as proximate a side of steep tank 12. Again, corn input feeder 14 can be a conventional corn input feeder apparatus.

Steeping apparatus 10 includes a first liquid (e.g., water) supply line 16, a second liquid (e.g., water) supply line 18, and a third liquid (e.g., water) supply line 19. The inlet of first liquid supply line 16 can be positioned at any level in steep tank 12, whereas the inlet of second liquid supply line 18, in some embodiments, is positioned at a level below the eventual "full" level of tank 12, such as at least about 2-5 feet below the "full" level. In other embodiments, second liquid supply line 18 could be positioned level or even with the "full" level and still be effective. In the embodiment of FIG. 1, first liquid supply line 16 is positioned to provide liquid to tank 12 from a level above the "full" level. Third liquid supply line 19 is positioned in a lower region of tank 12, often within the corn bed. In some embodiments, only one liquid supply line may be used, although at least two are preferred, to obtain the large liquid input rate. If only one liquid supply line is present, it is preferred that the inlet of that liquid supply line is positioned at a level below the eventual "full" level of tank 12, preferably at least about 2-5 feet below the "full" level; both supply line 18 and supply line 19 are positioned below the eventual "full" level of tank 12.

Steeping apparatus 10 also includes a mat removal tool 20, connected to a vacuum source and shaped and sized to remove corn kernels and liquid from tank 12. Mat removal tool 20 is positioned at or close to the "full" level of tank 12. As described further below, mat removal tool 20 is used to remove the contaminated kernels that float at the top of tank 12.

Other apparatus 10 features, such as a liquid drain (to drain liquid from tank 12), a solids removal exit (to remove product (such as corn) from tank 12), and a liquid recycle line are not illustrated, and may be conventional features.

Typically, the methods of the present disclosure are batch processes, processing a defined volume or weight of corn. The methods of the present disclosure may be modified to allow the separation process to be a continuous process that utilizes a steady stream of corn to be processed. One skilled in the art of corn processing would readily be able to modify the details within this disclosure and apply the processes to a continuous steeping process.

In use, a batch of corn, which includes aflatoxin-contaminated corn, is fed into steep tank 12 of steeping apparatus 10 via feeder 14. Prior to being provided to steep tank 12, the corn kernels to be processed may be screened to remove debris such as rocks, twigs, trash, dust, corn cobs, husks, stalks, etc. Such initial screening methods are known. In FIG. 1, corn is fed into tank 12 via feeder 14, illustrated above the top of tank 12. It should be understood that corn could be provided into tank 12 by other mechanisms, such as a conveyor belt, directly from a truck, etc. Depending on the size of tank 12, the corn batch may be, for example, 4500 bushels or 126 tons to 27,000 bushels or 756 tons.

Liquid is provided to steep tank 12 via liquid inlets 16, 18 and/or 19. Preferably, the liquid is edible and/or food-compatible since it will be contacting corn, which may eventually be used for animal and human food. Examples of suitable liquid include water, brine or salt solutions (e.g., 0.001 M to 1.0 M sodium chloride solutions), sugar solutions, glycerin, alcohols (e.g., ethanol) or alcohol/water solutions and edible oils (e.g., soybean oil, corn oil, peanut oil, sunflower seed oil). Antioxidant(s), antifungal(s) and/or antibacterial material(s) can be present in the liquid. The liquid added to tank 12 may be any suitable liquid or mix of liquids, such as recycled liquid, recycled from, for example, a previous steeping or separation process or from another step of the corn processing process. Examples of suitable liquids for processes of this disclosure include mill water, mill water to steep or steep mill water, and steep water(s) (e.g., light steep water, heavy steep water, or intermediates).

In corn wet milling, the cleanest water, typically potable or city water, is used to first wash starch and then is used in the milling of corn, accumulating corn solubles, typically at a level of less than 4% dry solids. This water in the wet milling process is commonly known as mill water, process water, or mill process water. Mill water to steep (or steep mill water)—Mill water, after being used in wet milling process, is treated with sulfite and introduced to the steep battery as mill water to steep (or, steep mill water). Typically, mill water to steep has less than 4% dry solids. During steeping, water flows counter current in the steep battery, so that newest water (mill water to steep) encounters the longest steeped corn, with that water moving forward in the process contacting progressively newer corn the battery. As the water progresses through the steep battery, it decreases in $SO_2$ concentration, increases in solubles, and increases in lactic acid. Dry solids range from less than 4% to 7%. Light steep water ("LSW") is the oldest water in the steep battery and/or the water draw off of the steep battery and contains protein, ash, carbohydrates, lactic acid, etc. at a level of about 7 to 14% solids. LSW typically has a density of about 1.05-1.08. Heavy steep water ("HSW"), also known as corn steep liquor, is light steep water that has been concentrated by evaporation to approximately 45-50% dry solids. HSW typically has a density of about 1.2-1.4. Intermediate evaporated steep water(s) are partially evaporated light steep water, with a dry solids and density between light steep water and heavy steep water (for example, with a density of about 1.15).

Any number of liquids may be mixed to obtain the desired liquid for the separation process, and various additives may be added to customize the liquid with desired properties such as density, Baume, viscosity, specific gravity, etc. The liquid typically has a density of about 0.99-1.2. The liquid may be heated, for example, having a temperature of 70-140° F., optionally 115-130° F.

The liquid can be added to tank 12 after the corn is added, prior to addition of the corn, and/or added simultaneously with the corn. In some embodiments, at least some amount of the liquid (e.g., 20-85%, e.g., 30-55% of the volume of tank 12) is added to steep tank 12 prior to addition of corn, and an amount of the liquid is added to steep tank 12 simultaneously with the corn. In one embodiment, approximately 30-55% of the volume of tank 12 is filled via any of or all of liquid inlets 16/18/19, after which additional liquid is added via second liquid inlet 18 or third inlet 19 simultaneously with the corn. Depending on the size of tank 12, the size of the corn batch, and/or the corn fill rate, a flow rate of about 1000 to about 1500 gallons per minute of liquid may be used.

Aflatoxin-contaminated corn kernels, which have a lower specific gravity than the liquid, rise in steep tank 12, floating on the liquid. Uncontaminated or less contaminated corn kernels, which have a specific gravity higher than the liquid, sink or submerge in steep tank 12. Once the contaminated corn has begun to float at the top of the liquid, preferably any water subsequently added is added from second liquid inlet 18 and/or third liquid inlet 19, which are positioned below the level of the floating corn mat. In this manner, the floating corn mat is disturbed less than if liquid was added from first liquid inlet 16 which, in this embodiment, is positioned above the floating corn mat.

FIG. 1 illustrates a bed of less contaminated corn 100 at the bottom of steep tank 12. Substantially all of the whole corn kernels in bed 100 are nearly aflatoxin-free or contain very low levels of aflatoxin. A mat or layer 102 that includes aflatoxin-contaminated corn 103 floats above less contaminated corn 100 on liquid 104. Mat 102 may additionally include debris such as cobs, husks, chaff, and other light debris that was not previously removed. As indicated above, any liquid (e.g., LSW, HSW) added to tank subsequent to mat 102 forming and floating on liquid 104 is added via second liquid inlet 18 and/or third liquid inlet 19.

As described above, the corn batch is added to tank 12 together with an amount of liquid, thus providing agitation to the corn allowing contaminated corn to escape from corn bed 100 and rise in liquid 104. In some embodiments, corn bed 100 may be agitated, for example by a stirring mechanism, water turbulence, or air jets, to further release any contaminated corn from bed 100 and allow it to rise to mat 102. Liquid from liquid inlet 19 in the lower region of tank 12 may sufficiently agitate corn bed 100. In most processes, mat 102 forms above corn bed 100 and liquid 104 within several minutes. The total exposure time of the corn to the liquid is generally at least 5 minutes and typically no more than about 4 hours; this time window provides thorough physical separation of contaminated corn from uncontaminated and less contaminated corn.

The amount of liquid 104 present in tank 102 is sufficient to provide a distinct delineation between less contaminated corn bed 100 and floating mat 102. For a commercial scale operation, one having a steep tank 12 of about 30,000-300,000 gallons or one processing about 120-760 tons of corn in a batch, the distance between corn bed 100 and floating mat 102 is at least 1 foot, in some embodiments at least 2 feet, for example, 3-6 feet. This distance is typically not dependent on the tank or corn batch volume.

Returning to FIG. 1, mat 102 that includes the aflatoxin-contaminated corn 103 is removed from steep tank 12 via a mat removal element, in this embodiment a vacuum or suction tool 20, which vacuums or sucks mat 102 off from liquid 104. Not only does mat removal tool 20 remove contaminated corn 103 from tank 12, but can remove all material in mat 102, such as husks, stalks, and other floating debris. An amount of liquid is also removed by mat removal tool 20 together with corn 103, although this liquid can be separated from contaminated corn 103 and returned to tank 12 or otherwise recycled.

Figure 2A:
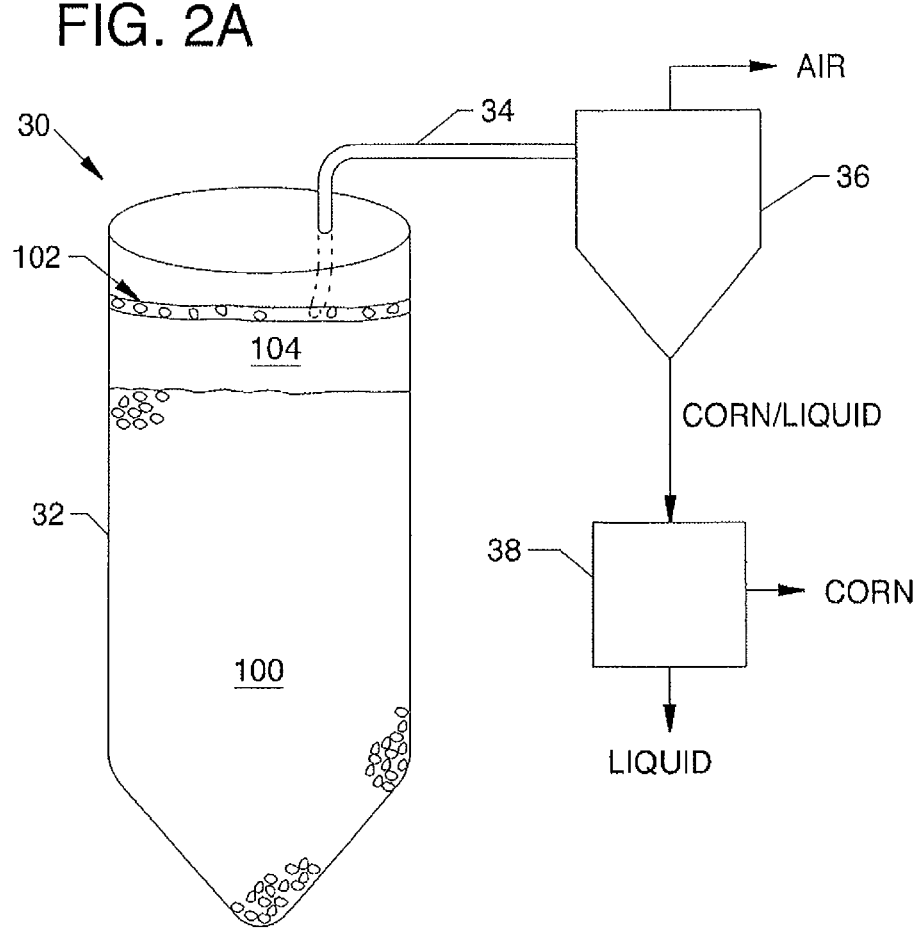
FIG. 2A is a schematic side view of a process according to this disclosure.

FIG. 2A illustrates a separation process according to the present disclosure, the process including a steeping apparatus similar to steeping apparatus 10 of FIG. 1. In FIG. 2A, the process includes a steeping apparatus 30 having a steep tank 32 and a mat removal vacuum tool 34. Not illustrated in FIG. 2A but present, are liquid inlet(s) for steep tank 32. Also not illustrated are features such as a liquid drain (to drain liquid from tank 32) and solids removal exit (to remove product (such as corn) from tank 32). Within tank 32 are corn bed 100 and mat 102 floating on liquid 104.

The illustrated process includes a separation section including a first separator 36 and a second separator 38 into which mat 102 is passed after being removed from tank 32 via mat removal tool 34. In this embodiment, first separator 36 is a vapor separator, configured to remove extraneous gas from the stream removed from tank 32 via mat removal tool 34, and second separator 38 a liquid-solid separator, configured to remove liquid from the contaminated corn.

Figure 2B:
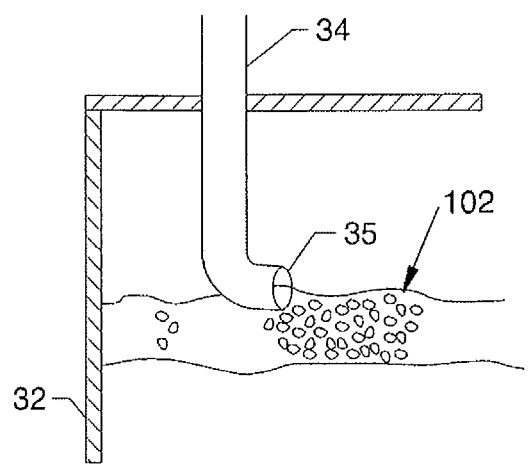
FIG. 2B is an enlarged view of a portion of the process of FIG. 2A.

FIG. 2B shows an enlarged view of mat removal tool 34 inserted into tank 32. Tank 32 is illustrated as a covered tank, with mat removal tool 34 passing through an aperture in the tank lid. In FIG. 2B, inlet 35 of tool 34 is illustrated at least partially within mat 102. In the illustrated embodiment, inlet 35 is positioned only partially in mat 102 with a portion of inlet 35 positioned above mat 102, thus sucking in air simultaneously with mat 102. In alternate embodiments, inlet 35 may be entirely positioned within mat 102 or within mat 102 and liquid 104.

Further in FIG. 2B, mat removal tool 34 is oriented with inlet 35 essentially parallel to mat 102. In other embodiments, such as illustrated in FIG. 1, tool 20 is oriented with its inlet angled to mat 102, for example, at an angle of about 15-45 degrees to mat 102. In yet other embodiments, the mat removal tool may be oriented with the inlet directly vertical, either in or above mat 102.

Inlet 35 of mat removal tool 34 is shaped and sized to allow multiple corn kernels to be sucked simultaneously. One embodiment of an inlet is a 4 inch circular pipe, although other shapes, such as oval or rectangular (including square), could alternately be used. The vacuum or suction provided by mat removal tool 20 or 34 is sufficient to pick-up and remove wet corn kernels and other debris. In some embodiments, mat removal tool 20 or 34 is vertically adjustable, to compensate for different levels in the tanks. Typically a vacuum motor with 5-60 horsepower (HP) provides sufficient vacuum for a square inch of inlet area. In some embodiments, a vacuum motor of 25-40 HP per square inch is used.

FIG. 3 illustrates an embodiment of a mat removal vacuum tool, such as mat removal tool 20 or mat removal tool 34, configured to remove (e.g., suck) mat 102 off from liquid 104. Mat removal tool 40 has an inlet 42 sized and shaped to allow corn kernels and other material from mat 102 to be removed from the tank. At an end opposite inlet 42, mat removal tool 40 is connected to a vacuum source, as will be described later, to pull mat 102 into tool 40. Tool 40 has an elongate body 44, impermeable to liquid and to other material (i.e., corn, etc.) in mat 102 from passing through body 44. Body 44 may be described as a tube, hose, pipe or other similar element. Present within body 44 is a section of perforated body 45; perforated section 45 has apertures therein that allow liquid but not whole corn kernels to pass therethrough. External to perforated section 45 and enclosing perforated section 45 is a shroud 46. Mat removal tool 40 includes a first suction connection 48 and a second suction connection 49. First suction connection 48 is connected to body 44 and to inlet 42 and provides a vacuum predominantly the length of body 44, to suck mat 102 from tank. Second suction connection 49 is connected to shroud 46 and provides a vacuum into shroud 45, to remove liquid from body 44 via perforated section 45.

In use, mat removal tool 40 collects (sucks) mat 102 (including at least liquid and corn kernels) into body 44 by way of inlet 42 due to first suction connection 48 and optionally due to second suction connection 49. Liquid passes through perforated section 45 into shroud 46 due to second suction connection 49. The corn kernels, still wetted with liquid but preferably no longer suspended in liquid, proceed through body 44 to be discarded or for further separation and/or drying. The liquid removed via second suction connection 49 can be recycled and reused.

Figure 4A:
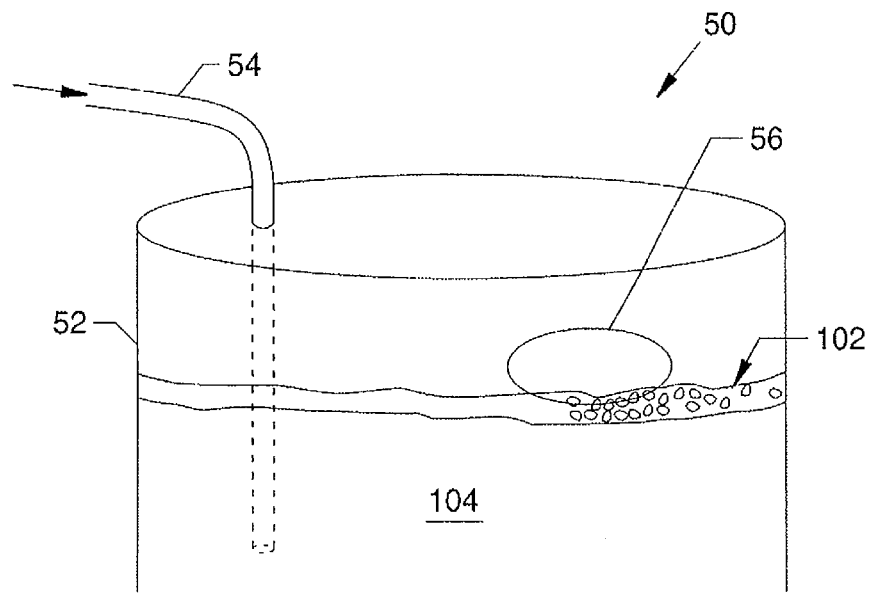
FIG. 4A is a schematic side view of a second embodiment of equipment for a process according to this disclosure.
Figure 4B:
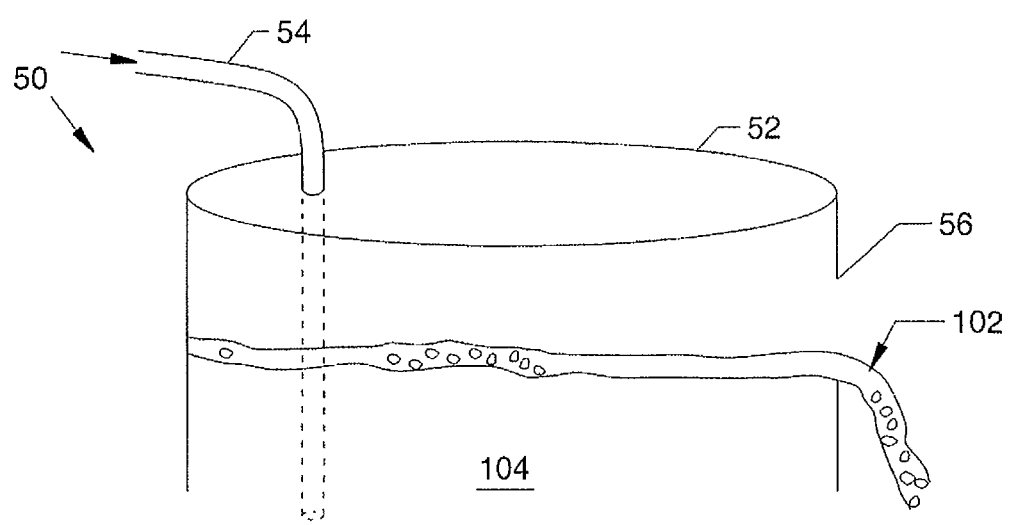
FIG. 4B is a schematic side view from a different vantage point of the process of FIG. 4A.

Referring now to FIGS. 4A and 4B, a steeping apparatus 50, which is part of an overflow or spillover process according to this disclosure, is illustrated. Steeping apparatus 50 includes a steep tank 52, which can be a conventional steep tank for corn. Steeping apparatus 50 includes at least one liquid (e.g., water) supply line 54 positioned at a level below the eventual "full" level of tank 52, preferably at least about 2-5 feet below the "full" level. Apparatus 50 may include a second supply line, such as illustrated in and described in relation to FIG. 1. FIGS. 4A and 4B also show contamination mat 102 floating on liquid 104.

Steeping apparatus 50 includes a mat removal element, in this embodiment an aperture or scupper 56 within the wall of tank 52, to allow floating contaminated mat 102 to be removed from tank 52. Scupper 56 is positioned at or close to the "full" level of tank 52. As the liquid level in tank 52 increases (rises), mat 102 likewise rises and flows out scupper 56. This flowage can be directly discarded, or collected and processed to separate the corn kernels from the liquid.

Steeping apparatus 50 also includes a corn input feeder (not shown) that provides corn kernels to steep tank 52, a liquid drain (not shown) to drain liquid from tank 52 and a solids removal exit (not shown) to remove product (such as corn) from tank 52; each of these may be conventional features.

Figure 5A:
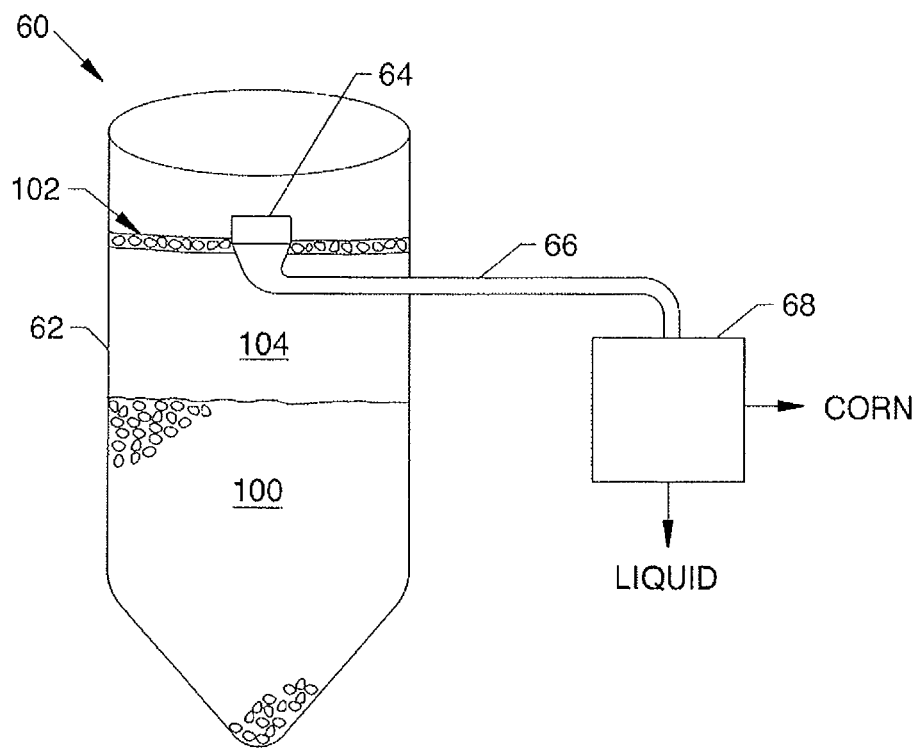
FIG. 5A is a schematic side view of another embodiment of a process according to this disclosure.

FIG. 5A illustrates a separation process according to the present disclosure, the process including a steeping apparatus similar to steeping apparatus 50 of FIGS. 4A and 4B. In FIG. 5A, the process includes a steeping apparatus 60 having a steep tank 62 and a mat removal scupper 64. Not illustrated in FIG. 5A but present, are liquid inlet(s) for steep tank 62, a liquid drain to drain liquid from tank 62, and solids removal exit to remove product (such as corn) from tank 62. Within tank 62 are corn bed 100 and mat 102 floating on liquid 104.

The illustrated process includes a separation section, connected to scupper 64 via piping 66. The separation section includes a separator 68 into which mat 102 passes after being removed from tank 62 by way of scupper 64. Separator 38 a liquid-solid separator, configured for removing liquid from the contaminated corn.

Figure 5B:
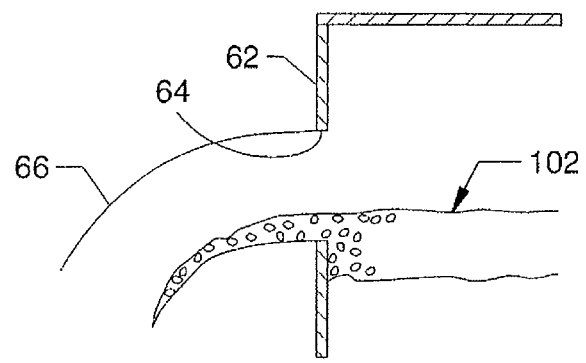
FIG. 5B is an enlarged view of a portion of the process of FIG. 5A, viewed from a different vantage point.

FIG. 5B shows an enlarged view of scupper 64 in covered tank 62. Not illustrated, a weir may be present at scupper 64, between piping 66 and tank 62. Floating mat 102 in tank 62 flows into and through scupper 64 and is taken to separator 68 by piping 66.

Figure 6:
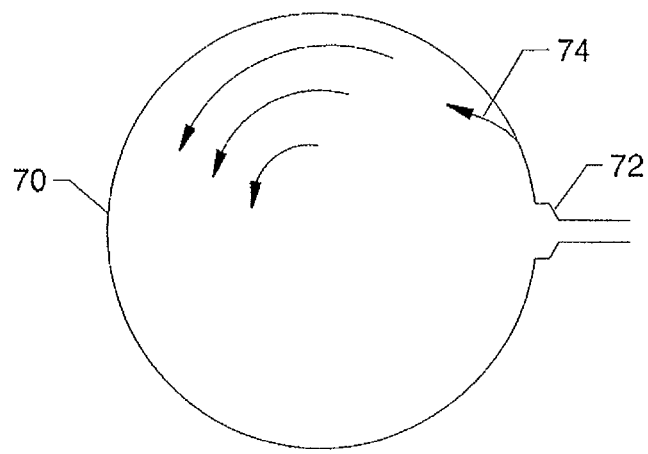
FIG. 6 is a schematic top view of an embodiment of a motive force in equipment for a process according to this disclosure.
Figure 7:
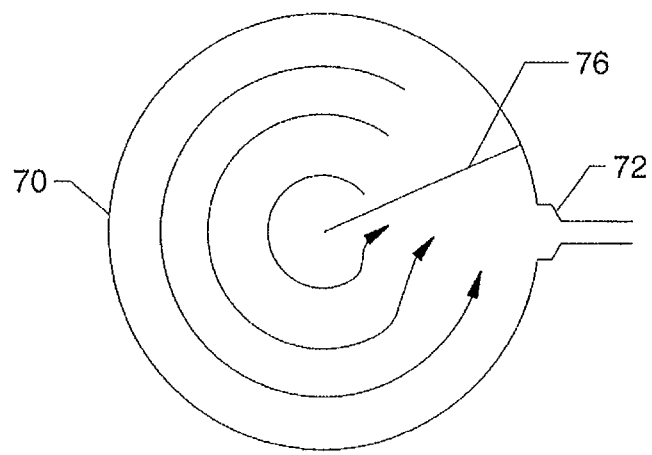
FIG. 7 is a schematic top view of another embodiment of a motive force in equipment for a process according to this disclosure.
Figure 8:
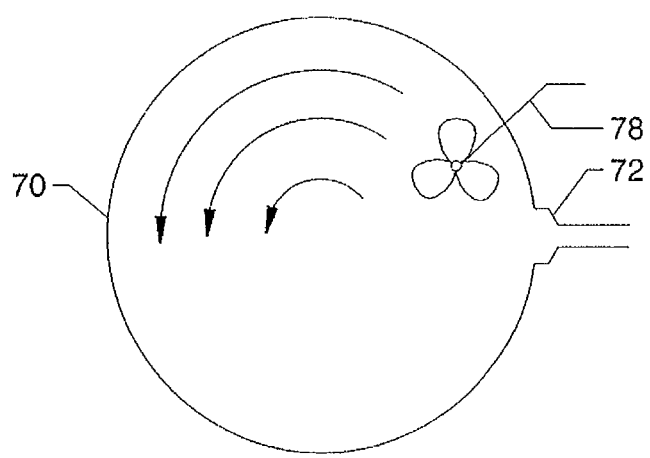
FIG. 8 is a schematic top view of yet another embodiment of a motive force in equipment for a process according to this disclosure.

For both overall embodiments, the suction process (shown in FIGS. 1, 2A, 2B) and the overflow process (shown in FIGS. 4A, 4B, 5A, 5B), various mechanism(s) may be added to the tank to facilitate the removal of the floating corn mat. FIGS. 6-8 illustrate three embodiments of motive forces suitable for urging floating corn in a desired direction. One or multiple motive force embodiments may be used.

FIG. 6 illustrates one example of a motive force to move the floating corn mat towards the removal area (i.e., either the suction removal tool or the overflow scupper). In FIG. 6, tank 70 is shown with a scupper apparatus 72. Injected into tank 70 is a fluid, which may be liquid or gas (e.g., air). The liquid may be a liquid pulled from tank 70 (and thus, recycled) or may be fresh liquid. The injected fluid 74 creates a rotational flow in the liquid and/or the corn mat in tank 70, depending on the vertical positioning of injected fluid 74 in relation to the floating corn mat. Fluid 74 is preferably injected below the corn mat, to inhibit disturbing the continuity of the mat, although in some embodiments, injecting fluid 74 at an angle over the floating mat is desired. The rotational flow created by injected fluid 74 brings the floating mat to scupper apparatus 72. The angle of injected fluid 74 may be 0 (zero) degrees or tangential in relation to the wall of tank 70, may be 90 degrees or radial to the wall of 70, or may be any angle therebetween, for example, 30 degrees or 45 degrees from the wall of tank 70.

FIG. 1 also illustrates a motive force source to move the floating corn mat towards the removal point. In FIG. 1, liquid inlet 18, positioned below corn mat 102, is directed to create a rotational flow in liquid 104 and thus corn mat 102.

FIG. 7 illustrates another example of a motive force to move the floating corn mat towards the removal area (i.e., either the suction removal tool or the overflow scupper). In FIG. 7, tank 70 with scupper apparatus 72 includes a mechanical baffle or boom 76 to physically urge the corn mat toward scupper apparatus 72. Baffle or boom 76 may be fixed in relation to the wall of tank 70 or may be pivotally or otherwise moveably situated. Movement of baffle or boom 76 may, in some embodiments, compress the mass of floating corn, creating a thicker mat.

FIG. 8 illustrates another example of a motive force to move the floating corn mat toward the removal area. In FIG. 8, tank 70 with scupper apparatus 72 includes a motorized mechanism, such as a propeller connected to a motor 78, to create a rotational flow in the liquid and/or the corn mat in tank 70, depending on the vertical positioning of the propeller in relation to the floating corn mat. The propeller is preferably positioned so that the water disturbance (and any turbulence) is created below the corn mat, to inhibit disturbing the continuity of the mat.

The separation processes of this disclosure, which utilize a liquid floatation process to separate aflatoxin-containing kernels from uncontaminated and less contaminated kernels and then utilize a vacuum or an overflow process to remove the contaminated corn kernels, provide a reduction of as much as 80% or more of the aflatoxin level in the corn batch, while removing no more than 15% of the initial corn in the batch. In some embodiments, the amount of corn removed is no more than 10% of the initial corn in the batch, in other embodiments no more than 5%. Even removal of 1-3% of the corn from the initial batch provides good aflatoxin level reduction in the corn bed. The level of aflatoxin remaining in the corn (i.e., in the corn bed) is typically no more than 10 ppb, often no more than 6 ppb. In some embodiments, levels of less than 5 ppb, less than 3 ppb, less than 2 ppb, and even less than 1 ppb are obtained by processes of this disclosure.

The processes of this disclosure are particularly efficient, producing unprecedented reduction of aflatoxin levels, across a wide range of initial aflatoxin levels. Additionally, the processes of this disclosure obtain a high reduction of aflatoxin level across a wide density (i.e., moisture content) of incoming corn.

EXAMPLES

The floatation and separation processes of this disclosure were run on lab-scale, pilot-plant-scale, and commercial-scale.

Batches of corn, screened to remove debris but otherwise untreated, were processed according to methods of this disclosure. For Examples 1 through 12, the corn was obtained from a first source and for Examples 13 through 25 the corn was obtained from a second, different source. Aflatoxin-contaminated corn was separated from less contaminated corn by floatation on light steep water (LSW) or diluted LSW. The LSW had a Baume (Be) of 6 at a temperature of 60° F., unless otherwise indicated. The floating mat of contaminated corn was removed by either (a) overflow and screening of the corn in laboratory experiments, (b) screening of the corn in the mini-pilot scale experiments, (c) screening or an overflow or overspill process in pilot scale experiments, and (d) a suction or vacuum process or an overflow or overspill process in commercial scale experiments.

Laboratory scale experiments were performed by adding 500 g of aflatoxin containing corn, sometimes in multiple batches, to 2000 ml of LSW at Be of 6 at 60° F. (or to LSW diluted to Be of 3 at 60° F.) into a beaker with 2.3 liter volume. The corn was added through a funnel about 6 inches above the surface of the water. Actual temperature of the LSW was approximately 90-110° F. A pan was placed below the beaker to catch corn and steep water that overflowed the container as the corn was added. The remaining corn that floated was allowed to resolve and was removed by hand screening with a 12-mesh screen. Water was decanted from the remaining corn ("sinkers"), then the float layer and sinkers were dried to approximately 10-15% moisture prior to grinding and analysis for aflatoxin.

For mini-pilot experiments, floatation was carried out in a 5 gallon container, with 12 liters of LSW, with 3000 g to 8000 g of corn added. No corn overflowed the 5 gallon container, so all the float layer was hand screened.

For pilot experiments, floatation was carried out in a 35 gallon drum, with about 110 liters of LSW, with 5 gallons (approximately 13 kg) of corn added. Corn was poured into the drum over a period of approximately 20 seconds. Corn in the floating layer was then either hand screened or overflowed. For the overflow or overspill process, sufficient LSW was added to the tank for the tank to overflow.

Aflatoxin level was determined on the dried corn floater and sinker samples by either Charm ROSA quantitative aflatoxin test, with dilution of samples in negative control buffer if greater than 150 ppb aflatoxin as directed by Charm technical services, or by Trilogy Analytical Laboratory AOAC 994.08 with modifications.

Levels of aflatoxin were measured for the initial corn batch, the separated and removed mat, and the settled corn. The levels are reported in Table 2, below.

TABLE 2

| Example | initial test weight (lb/bushel) | initial AT (ppb) | % corn in float mat | AT in float mat (ppb) | AT in corn bed (ppb) | % of initial AT in mat |
| --- | --- | --- | --- | --- | --- | --- |
| 1 | 52.9 | 11 | 15.1 | 71 | 1 | 96.2 |
| 2 | 52.9 | 11 | 4.3 | 275 | ND* | 100 |
| 3 | 53.3 | 5 | 2.3 | 237 | ND* | 100 |
| 4 | 51.8 | 46 | 5.7 | 831 | 1 | 99 |
| 5 | 50.2 | 18 | 7.5 | 116 | ND* | 100 |
| 6 | 50.2 | 25 | 8.2 | 314 | 1 | 98.1 |
| 7 | 50.2 | 20 | 8 | 539 | 2 | 95.6 |
| 8 | 54.6 | 62 | 11.1 | 572 | 1 | 99.3 |
| 9 | 54.6 | 21 | 6.6 | 303 | 2 | 93.3 |
| 10 | 54.6 | 37 | 7 | 523 | 1 | 97.5 |

TABLE 1

| Example | Test | Volume of Tank | Mat Removal Process | General comments |
| --- | --- | --- | --- | --- |
| 1 | Laboratory | 2.3 liter | Overflow + screening | Corn initially screened with 3.5 mesh; LSW had Be = 8.21 @ 60° F. |
| 2 | Pilot plant | 35 gal | screening | |
| 3 | Pilot plant | 35 gal | screening | LSW had Be = approximately 1 @ 60° F. |
| 4 | Laboratory | 2.3 liter | Overflow + screening | LSW had Be = 5.7 @ 60° F. |
| 5 | Mini pilot plant | 5 gal | screening | |
| 6 | Mini pilot plant | 5 gal | screening | |
| 7 | Mini pilot plant | 5 gal | screening | |
| 8 | Pilot plant | 35 gal | screening | |
| 9 | Pilot plant | 35 gal | overflow | |
| 10 | Pilot plant | 35 gal | overflow | |
| 11 | Mini pilot plant | 5 gal | screening | |
| 12 | Mini pilot plant | 5 gal | screening | |
| 13 | Laboratory | 2.3 liter | Overflow + screening | LSW had Be = 8.21 @ 60° F. |
| 14 | Laboratory | 2.3 liter | Overflow + screening | |
| 15 | Laboratory | 2.3 liter | Overflow + screening | LSW had Be = 3 @ 60° F. |
| 16 | Laboratory | 2.3 liter | Overflow + screening | |
| 17 | Laboratory | 2.3 liter | Overflow + screening | |
| 18 | Laboratory | 2.3 liter | Overflow + screening | LSW had Be = 5.7 @ 60° F. |
| 19 | Mini pilot plant | 5 gal | screening | |
| 20 | Mini pilot plant | 5 gal | screening | |
| 21 | Mini pilot plant | 5 gal | screening | |
| 22 | Mini pilot plant | 5 gal | screening | |
| 23 | Mini pilot plant | 5 gal | screening | |
| 24 | Mini pilot plant | 5 gal | screening | |
| 25 | Mini pilot plant | 5 gal | screening | |

TABLE 2-continued

| Example | initial test weight (lb/bushel) | initial AT (ppb) | % corn in float mat | AT in float mat (ppb) | AT in corn bed (ppb) | % of initial AT in mat |
|---|---|---|---|---|---|---|
| 11 | 53.2 | 10 | 1.3 | 347 | 6 | 42.6 |
| 12 | 53.2 | 16 | 1.6 | 825 | 3 | 84.3 |
| 13 | 51.6 | 6 | 13.4 | 42 | 1 | 92.7 |
| 14 | 54 | 21 | 2.5 | 814 | 1 | 95.5 |
| 15 | 50.3 | 34 | 6 | 561 | 1 | 98.6 |
| 16 | 52.5 | 22 | 4.1 | 517 | 1 | 97.8 |
| 17 | 51.7 | 19 | 5.1 | 292 | 12 | 68.1 |
| 18 | 51.7 | 33 | 4.7 | 627 | 4 | 89.9 |
| 19 | 56.5 | 19 | 2.5 | 831 | ND* | 100 |
| 20 | 56.5 | 20 | 2.3 | 715 | 5 | 76.1 |
| 21 | 56.5 | 67 | 3.1 | 2420 | ND* | 100 |
| 22 | 56.5 | 8 | 13.6 | 59 | 1 | 94.7 |
| 23 | 56.8 | 49 | 2.2 | 28 | 49 | 1.3 |
| 24 | 56.6 | 13 | 1.1 | 963 | 4 | 73.8 |
| 25 | 57.4 | 12 | 1.6 | 699 | 1 | 91.9 |

"ND*" stands for "non detected".
The level of aflatoxin was less than 1 ppb.

Figure 9:
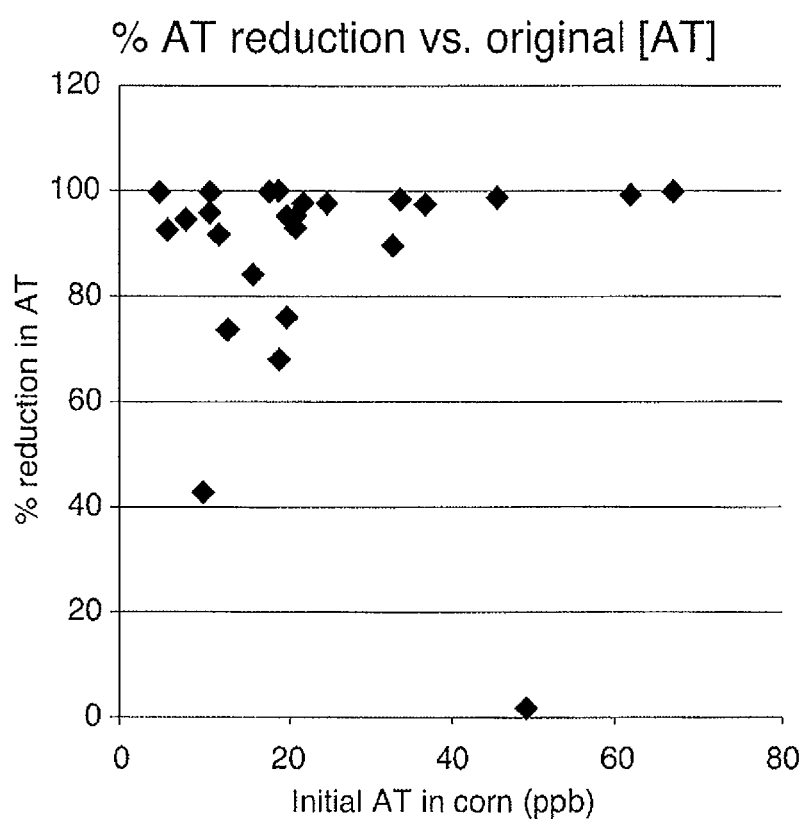
FIG. 9 is a graphical representation of test results showing that the processes of this disclosure produce a remarkably high reduction of the initial aflatoxin levels.
Figure 10:
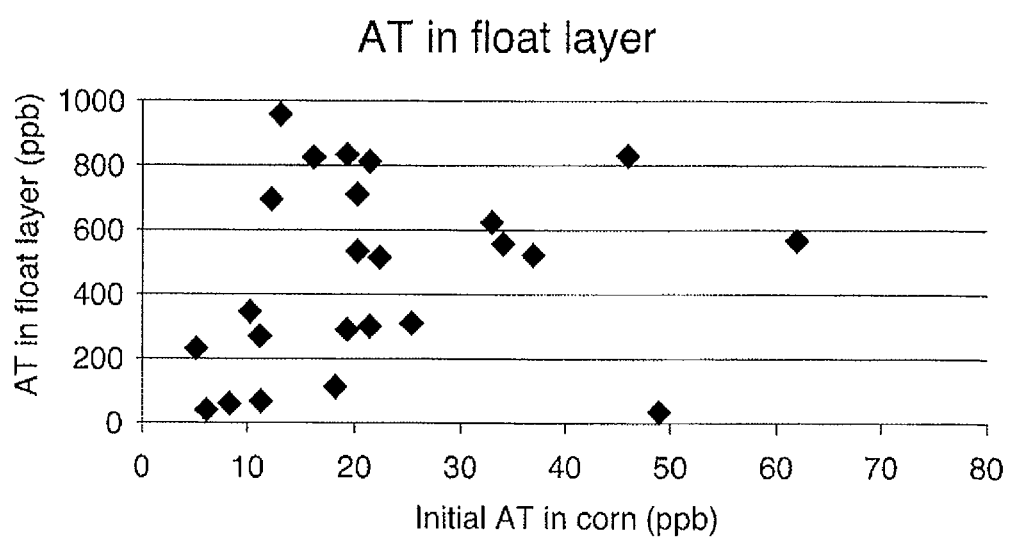
FIG. 10 is a graphical representation of test results showing that the processes of this disclosure are applicable for a wide range of initial aflatoxin levels.
Figure 11:
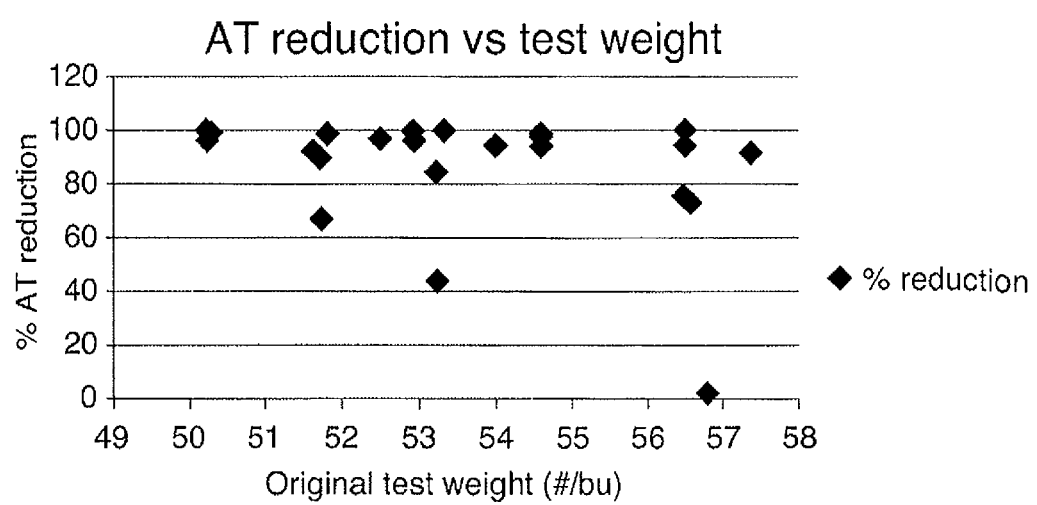
FIG. 11 is a graphical representation of test results showing that the processes of this disclosure are applicable for a wide range of corn densities and moisture contents.

FIGS. 9-11 show various results from the above runs.

FIG. 9 shows the percent reduction of aflatoxin level in the corn bed after the floating mat is removed as compared to the initial aflatoxin level in the incoming corn. FIG. 10 shows the aflatoxin level in the floating mat as compared to the initial aflatoxin level in the incoming corn. The data show that the decrease in aflatoxin levels is applicable for a wide range of initial aflatoxin levels and that the level of aflatoxin in the floating mat was more than the initial level. One data point (Example 23) at initial 49 ppb showed almost no aflatoxin level reduction. Also, one data point (Example 11) at initial 10 ppb showed a reduction of only about 43%. Although the separation processes of this disclosure are particularly efficient in the reduction of aflatoxin levels, there occasionally may be a corn sample that will not float well and thus not separate well.

FIG. 11 shows the percent reduction of aflatoxin level in the corn bed in relation to the test weight (in pounds per bushel) of the incoming corn. The data show that the floatation separation is applicable for a wide range of corn weight.

What is claimed is:

1. A system for reducing aflatoxin levels in corn, the system comprising:
a tank comprising at least one fluid inlet and a predetermined fill level;
a mat removal tool capable of removing corn and liquid from the tank, wherein the mat removal tool is connected to a vacuum source sized and shaped to remove aflatoxin-contaminated corn and liquid;
a liquid having a volume sufficient to cover a batch of corn having aflatoxin-contaminated corn and uncontaminated corn and having a density greater than the aflatoxin-contaminated corn;
wherein the contaminated corn floats at the top of the liquid in the tank and the mat removal tool removes the aflatoxin-contaminated corn from the uncontaminated corn.

2. The system of claim 1, wherein the at least one fluid inlet is positioned at a level below the fill level of the tank.

3. The system of claim 1, wherein the at least one fluid inlet comprises two or more fluid inlets positioned at a level different from the first fluid inlet.

4. The system of claim 1, wherein the mat removal tool is positioned at or close to the fill level of the tank.

5. The system of claim 1, wherein the mat removal tool includes an aperture or scupper within the wall of tank and at a level positioned or close to the fill level of the tank.

6. The system of claim 1, wherein the liquid is added to overflow the floating aflatoxin-contaminated corn out from the tank.

7. The system of claim 1, wherein the liquid has a density of 0.99-1.2.

8. The system of claim 1, wherein the liquid comprises water, brine, salt solutions, sugar solutions, glycerin, alcohol, edible oils or combinations thereof.

9. The system of claim 1, wherein the liquid comprises recycled liquid, comprising any of light steep water, heavy steep water, mill water, steep mill water, and mixtures thereof.

10. The system of claim 1, wherein the system is capable of reducing aflatoxin level in the corn batch by as much as 80% or more.

11. The system of claim 1, wherein the removed aflatoxin-contaminated corn is not more than 5% of the batch of corn.

12. The system of claim 1, wherein the system is capable of providing uncontaminated corn with an aflatoxin level of no more than 3 ppb.

13. The system of claim 1, wherein the system is capable of providing a motive force to the liquid in the tank.

* * * * *